US012097693B2

(12) United States Patent
Sudermann et al.

(10) Patent No.: US 12,097,693 B2
(45) Date of Patent: Sep. 24, 2024

(54) CLAMPING SHAFT, PRINTING CYLINDER UNIT AND METHOD FOR OPERATING A CLAMPING SHAFT

(71) Applicant: BOBST BIELEFELD GmbH, Bielefeld (DE)

(72) Inventors: Alexander Sudermann, Schloss Holte-Stukenbrock (DE); Jörg Fortmann, Herford (DE)

(73) Assignee: BOBST BIELEFELD GMBH, Bielefeld (DE)

( * ) Notice: Subject to any disclaimer, the term of this patent is extended or adjusted under 35 U.S.C. 154(b) by 400 days.

(21) Appl. No.: 17/595,407

(22) PCT Filed: May 7, 2020

(86) PCT No.: PCT/EP2020/062773
§ 371 (c)(1),
(2) Date: Nov. 16, 2021

(87) PCT Pub. No.: WO2020/234004
PCT Pub. Date: Nov. 26, 2020

(65) Prior Publication Data

US 2022/0194074 A1 Jun. 23, 2022

(30) Foreign Application Priority Data

May 23, 2019 (EP) .................................... 19020339

(51) Int. Cl.
*B41F 27/10* (2006.01)

(52) U.S. Cl.
CPC .................................. *B41F 27/105* (2013.01)

(58) Field of Classification Search
CPC .... B41F 27/105; B41F 27/10; B41F 27/1293; B41F 13/10; B41F 13/20
See application file for complete search history.

(56) References Cited

U.S. PATENT DOCUMENTS

| | | | |
|---|---|---|---|
| 3,449,795 | A | 6/1969 | Fischbach |
| 4,386,566 | A | 6/1983 | Moss |

(Continued)

FOREIGN PATENT DOCUMENTS

| | | | |
|---|---|---|---|
| CN | 101508195 | A | 8/2009 |
| CN | 103608181 | A | 2/2014 |

(Continued)

OTHER PUBLICATIONS

International Search Report issued Jul. 23, 2020 in International Application No. PCT/EP2020/062773.

*Primary Examiner* — Jennifer Bahls
*Assistant Examiner* — Quang X Nguyen
(74) *Attorney, Agent, or Firm* — Bookoff McAndrews, PLLC

(57) ABSTRACT

A clamping shaft (12) for a rotationally driven part (14) is described. It comprises at least one fluid chamber (28*a*, 28*b*) being located inside a shaft body (16) and being delimited by a piston (30*a*, 30*b*) and a cylinder part (32*a*. 32*b*). Additionally, the fluid chamber (28*a*, 28*b*) is delimited by an elastic clamping region (24*a*, 24*b*) having a first diameter if the piston (30*a*, 30*b*) and the cylinder part (32*a*, 32*b*) are in a first relative position, and a second diameter if the piston (30*a*, 30*b*) and the cylinder part (32*a*, 32*b*) are in a second relative position. Furthermore, a preloading unit (38) is provided, biasing the piston (30*a*, 30*b*) and the cylinder part (32*a*, 32*b*) towards the second relative position. Moreover, a printing cylinder unit (10) of a printing machine is presented comprising such a clamping shaft (12). Also, a method for operating a clamping shaft (12) is explained.

14 Claims, 3 Drawing Sheets

(56) References Cited

U.S. PATENT DOCUMENTS

Figure 1:
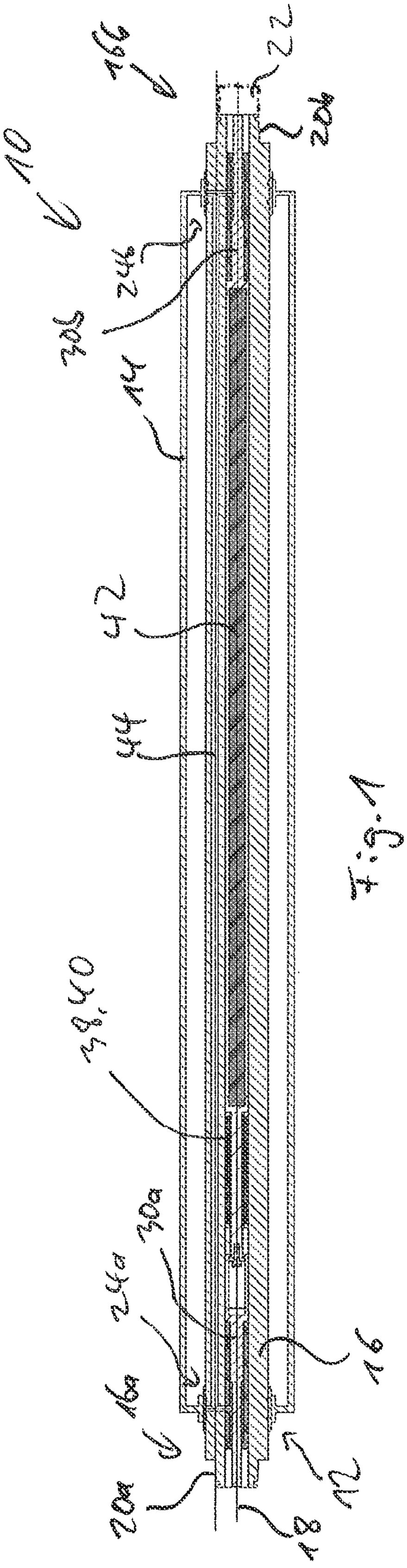

| | | | | |
|---|---|---|---|---|
| 6,227,112 B1 * | 5/2001 | Becker | B41F 13/00 | 101/230 |
| 2011/0107907 A1 * | 5/2011 | Busse | F15B 15/262 | 92/26 |

FOREIGN PATENT DOCUMENTS

| | | | |
|---|---|---|---|
| CN | 108472945 | A | 8/2018 |
| EP | 1745929 | A1 | 1/2007 |

* cited by examiner

CLAMPING SHAFT, PRINTING CYLINDER UNIT AND METHOD FOR OPERATING A CLAMPING SHAFT

CROSS-REFERENCE TO RELATED APPLICATION(S)

This application is a National Stage under 35 U.S.C. § 371 of International Application No. PCT/EP2020/062773, filed May 7, 2020, which claims priority to European Application No. 19020339.8, filed May 23, 2019, the entireties of which are incorporated herein by reference.

The invention relates to a clamping shaft for a rotationally driven part, comprising a shaft body being rotatable about a shaft axis, at least one fluid chamber being located inside the shaft body and being filled with a predetermined amount of fluid, wherein the fluid chamber is delimited by a piston surface of at least one piston being located inside the shaft body and a cylinder part, being movable relative to each other such that a volume of the fluid chamber is adjustable by moving the piston relative to the cylinder part, wherein the shaft body comprises at least one elastic clamping region delimiting the fluid chamber, and wherein the clamping region has a first diameter if the piston and the cylinder part are in a first relative position, and a second diameter if the piston and the cylinder part are in a second relative position, the second diameter being bigger than the first diameter, Additionally, the invention relates to a printing cylinder unit of a printing machine comprising such a clamping shaft.

Moreover, the invention relates to a method for operating a clamping shaft of the type mentioned above.

Such clamping shafts and printing cylinder units being equipped therewith are known in the art. The same applies to methods for operating clamping shafts.

The functioning of such clamping shafts is based on selectively pressurizing a fluid, which leads to an elastic expansion of a clamping region of the shaft. In doing so, a printing cylinder or any other rotationally driven part may be clamped to the shaft. The rotationally driven part may be released from the shaft by de-pressurizing the fluid, which leads to a contraction of the clamping region diameter.

It is noted that the fluid may be compressible or non-compressible. In the case of a non-compressible fluid, a volume of the fluid chamber will remain substantially constant, wherein the volume change resulting from the volume difference between the first and second relative position substantially equals the volume change resulting from the elastic deformation of the clamping region. In the case of a compressible fluid, the volume of the fluid chamber associated with the second relative position is smaller than the volume of the fluid chamber associated with the first relative position of the piston and the cylinder part.

In this context, the first relative position substantially corresponds to a pressure-relieved state of the fluid, i.e. the fluid is substantially at ambient pressure.

The fluid is often a hydraulic medium, e.g. hydraulic oil.

The fluid usually is pressurized by moving the piston, wherein the piston may be driven manually by actuating a screw or spindle being coupled thereto. In order to do so, a tool, e.g. a screw driver, is used. This process is reversible, i.e. the fluid is de-pressurized by moving the piston in an opposite direction.

It is an object of the present invention to further improve such clamping shafts. Especially, the operation of clamping shafts shall be easy to automate.

The problem is solved by a clamping shaft of the type mentioned above, wherein the clamping shaft further comprises at least one preloading unit, wherein the preloading unit applies a preloading force on the piston and/or the cylinder part such that the piston and the cylinder part are biased towards the second relative position. In other words, the clamping shaft is preloaded towards a clamping state. Consequently, no external force or energy is necessary in order to bring the clamping shaft into a clamping state in which the clamping region is elastically expanded. In order to bring the clamping shaft into a release state, the preloading force has to be actively counteracted by an external force or energy. Thus, the working principle of known clamping shafts is inverted. Since the preloading unit provides a preloading force internal to the clamping shaft, automation of the clamping process is facilitated.

The first relative position and the second relative position may be attained via three possibilities. In a first possibility, the piston is moved and the corresponding cylinder part is stationary. In this context, the cylinder part may be formed integrally with the shaft body or as a separate part. In a second possibility, the piston is stationary and the cylinder part is moved. In a third possibility, both the piston and the cylinder part are moved. In the second and third case, the cylinder part must be formed as a separate part, thus not as a portion of the shaft body.

In a clamping shaft according to the invention, the clamping shaft axis and a piston axis may be coaxial. This variant is especially suitable for clamping shafts rotating at high speed since the coaxial positioning results in a rotationally balanced clamping shaft. Of course, it is also possible to arrange the clamping shaft axis and the piston axis in a non-coaxial manner. This may lead to packaging advantages, i.e. such a clamping shaft only occupies a small installation space.

In principle, the preloading force may be chosen in function of the specific application case. In the fields of printing machines, the fluid may be pressurized to 200 bar and more. The preloading force will be chosen accordingly.

According to an embodiment, the clamping shaft comprises two fluid chambers, each being located inside the shaft body and each being filled with a predetermined amount of fluid, wherein each of the fluid chambers is delimited by a piston surface of a piston being located inside the shaft body and a cylinder part, being movable relative to each other such that a volume of the fluid chamber is adjustable by moving the piston relative to the cylinder part, wherein the shaft body comprises two elastic clamping regions each delimiting one of the fluid chambers, wherein the clamping regions have a first diameter if the corresponding and the corresponding cylinder part are in a first relative position, and a second diameter if the corresponding piston and the corresponding cylinder part are in a second relative position, the second diameter being bigger than the first diameter, and wherein the preloading unit is located between the pistons or between the cylinder parts and applies a preloading force on the pistons or the cylinder parts such that each of the pistons and the corresponding cylinder parts are biased towards the second relative position. Such a clamping shaft may clamp a rotationally driven part in two clamping regions, which leads to a very reliable coupling between the clamping shaft and the rotationally driven part. Since both pistons use a common preloading unit, the clamping shaft is relatively light and compact.

Preferably, the piston axis of the two pistons are coaxial.

The fluid chambers may be fluidically connected via a fluid connection line located inside the shaft body. As a consequence thereof, the pressure in both fluid chambers may be adjusted by using any one of the pistons. This means that it is possible to clamp or release a rotationally driven part form the clamping shaft by just actuating one piston or cylinder part. Consequently, the driven part is coupled to the clamping shaft in a highly reliable way and the clamping shaft is simple to operate.

Advantageously, an abutment surface associated with each piston is provided in the shaft body, each piston abutting against the respective abutment surface when in the second relative position. A movement of the piston into the clamping direction is thus limited. Consequently, a maximum clamping force or torque may be adjusted by providing such an abutment surface. Consequently, reliable clamping with a constant clamping force is guaranteed.

According to a variant, the preloading unit comprises a spring assembly. Such a spring assembly may be a disk spring assembly or a coil spring assembly. It is also possible to use gas springs. In the present context, the spring assemblies may also be termed an energy storage since the springs store the energy necessary for providing a second volume of the fluid chamber, i.e. the energy necessary for clamping the rotationally driven part. Such spring assemblies are easy to mount and reliable in operation.

Each of the clamping regions may be formed integrally with the shaft body or each clamping region may be provided by an elastically deformable sleeve provided on the shaft body. Both alternatives allow for reliably clamping the rotationally driven part to the clamping shaft.

The shaft body can comprise at least one bearing interface, by which the clamping shaft is rotatably supportable, the shaft body preferably comprising two bearing interfaces. The bearing interfaces are preferably located at axial ends of the clamping shaft. They may essentially be formed as cylinders or cone portions.

The shaft body also may comprise at least one drive interface by which the clamping shaft is rotationally drivable. The drive interface may be formed as a mounting interface for a gear or a pulley.

In an alternative at least one of the pistons and/or the cylinder part cooperating with the piston comprises an actuation interface by which an external force may be applied to the piston and/or the cylinder part counteracting the preloading force such that at least one of the pistons and the corresponding cylinder part are in the first relative position. In other words, via the actuation interface a force is applied to the piston or the cylinder part counteracting the preloading force. Consequently, the clamping shaft is in a release state in which the rotationally driven part is not coupled thereto. The actuation of the clamping shaft may comprise the application of a pushing force, a pulling force or a torque to the actuation interface. These forms of actuation may easily be automated.

Preferably, the actuation interface is provided in proximity to an axial end of the shaft body. In this context, the actuation interface may axially protrude from the clamping shaft or may be located in a recess provided at an axial end of the shaft body. In both alternatives, the actuation interface is easily accessible for manual or automated actuation.

Furthermore, the problem is solved by a printing cylinder unit of the type mentioned above, comprising a clamping shaft according to the invention. In such a printing cylinder unit a printing cylinder or an adapter may be selectively coupled to the clamping shaft via the clamping mechanism described above. In this context, a printing cylinder designates all kinds of cylinders used in a printing machine, especially a cliché cylinder of a flexographic printing machine.

The problem is also solved by a method for operating a clamping shaft of the type mentioned above, wherein the clamping shaft is in a clamping state if the clamping shaft is not actuated and wherein the clamping shaft is in a release state if the clamping shaft is actuated. Consequently, the functioning principle of known clamping shafts is inverted. As has already been explained above, this facilitates the automation of such clamping cylinders.

The clamping shaft may be actuated by pulling an actuation interface along an axial direction of the clamping shaft, by pushing an actuation interface along an axial direction of the clamping shaft or by turning an actuation interface around an axial direction of the clamping shaft. This actuation activities may be performed manually or automatically, e.g. by a robot or any other specific actuation unit.

The invention will now be explained with reference to two embodiments which are shown in the attached drawings. In the drawings, FIG. 1 shows a printing cylinder unit according to the invention comprising a clamping shaft according to the invention being operable by a method for operating a clamping shaft according to the invention, FIG. 2 the printing cylinder of FIG. 1 in an enlarged representation, wherein a middle section of the printing cylinder is cut out, FIG. 3 the printing cylinder of FIGS. 1 and 2 in a further enlarged representation, wherein a middle section of the printing cylinder is cut out, and FIG. 4 an alternative embodiment of the printing cylinder unit according to the invention in a schematic representation.

FIG. 1 shows a printing cylinder unit 10 of a printing machine, which comprises a clamping shaft 12 and a rotationally driven part 14.

In the examples shown the rotationally driven part 14 is a printing cylinder, e.g. a cliché cylinder of a flexographic printing machine or an adapter for such a printing cylinder.

The clamping shaft 12 comprises a shaft body 16 being rotatable about a shaft axis 18.

It may be rotatably supported inside a printing machine via two bearing interfaces 20*a*, 20*b* which are located at respective axial ends 16*a*, 16*b* of the shaft body 16. The bearing interfaces are formed as cone sections in the example shown.

In order to rotatably drive the clamping shaft 12, the shaft body 16 is equipped with a drive interface 22, which his only shown schematically.

The part 14 is clamped to the clamping shaft 12 via two clamping regions 24*a*, 24*b*. In the clamping regions 24*a*, 24*b* elastically deformable sleeves 26*a*, 26*b* are provided, which delimit a fluid chamber 28*a*, 28*b* respectively.

The fluid chambers 28*a*, 28*b* are located inside the shaft body 16 and both are filled with a predetermined amount of fluid, e.g. hydraulic oil.

Depending on the pressure of the fluid in the respective fluid chambers 28*a*, 28*b*, the sleeves 26*a*, 26*b* are deformed to have a first diameter or a second diameter, the second diameter being bigger than the first diameter.

Consequently, the part 14 is clamped to the clamping shaft 12 if the clamping regions 24*a*, 24*b* have a second diameter and may be axially and/or rotationally moved with respect to the clamping shaft 12 if the clamping regions 24*a*, 24*b* have a first diameter.

This change in diameter is achieved by altering the pressure inside the respective fluid chamber 28*a*, 28*b*. Thus, the first diameter is achieved if the fluid chambers 28*a*, 28*b* are pressurized and the second diameter is achieved if the fluid chambers 28*a*, 28*b* are de-pressurized, i.e. are substantially at ambient pressure.

In order to pressurize the fluid chambers 28*a*, 28*b* each of them is also delimited by a piston surface of a respective piston 30*a*, 30*b* being located inside the shaft body 16 and by a corresponding cylinder part 32*a*, 32*b*. Each piston 30*a*, 30*b* is movable relative to the corresponding cylinder part 32*a*, 32*b*, wherein in the example shown, the pistons are movable along a piston axis, which corresponds to the shaft axis 18. The cylinder parts 32*a*, 32*b* are formed as separate parts in the examples shown, but are axially and rotationally fixed inside the shaft body 16. Alternatively, the cylinder parts 32*a*, 32*b* may be formed as sections of the shaft body 16.

Thus, in the de-pressurized state of one of the fluid chambers 28*a*, 28*b*, the corresponding piston 30*a*, 30*b* and cylinder part 32*a*, 32*b* are in a first relative position.

In the pressurized state of one of the fluid chambers 28*a*, 28*b*, the corresponding piston 30*a*, 30*b* and cylinder part 32*a*, 32*b* are in a second relative position.

Additionally, an abutment surface 34*a*, 34*b* is formed on each of the cylinder parts 32*a*, 32*b*, wherein each of the abutment surfaces 34*a*, 34*b* is associated with one of the pistons 30*a*, 30*b* and the respective piston 30*a*, 30*b* abuts against the associated abutment surface 34*a*, 34*b* when the corresponding piston 30*a*, 30*b* and cylinder part 32*a*, 32*b* are in the second relative position.

On the pistons 30*a*, 30*b* counter abutment surfaces 36*a*, 36*b* are formed.

The clamping shaft 12 further comprises a preloading unit 38, which is formed such that it applies a preloading force on both pistons 30*a*, 30*b* such that the pistons 30*a*, 30*b* are biased towards the second relative position.

Figure 2:
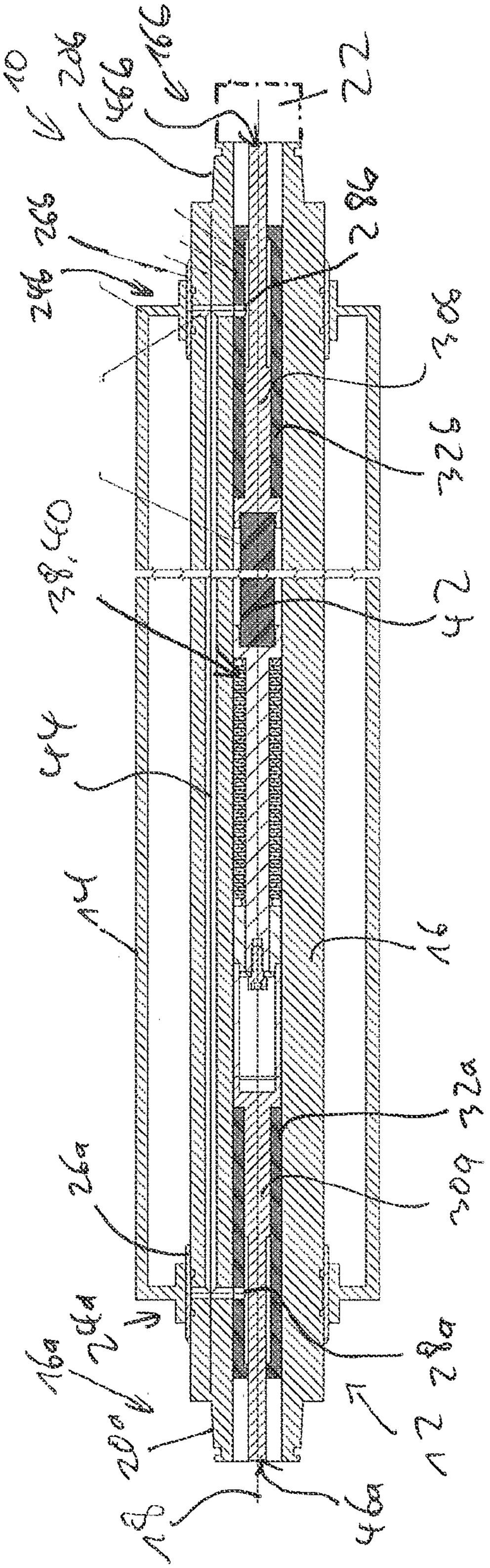
Figure 3:
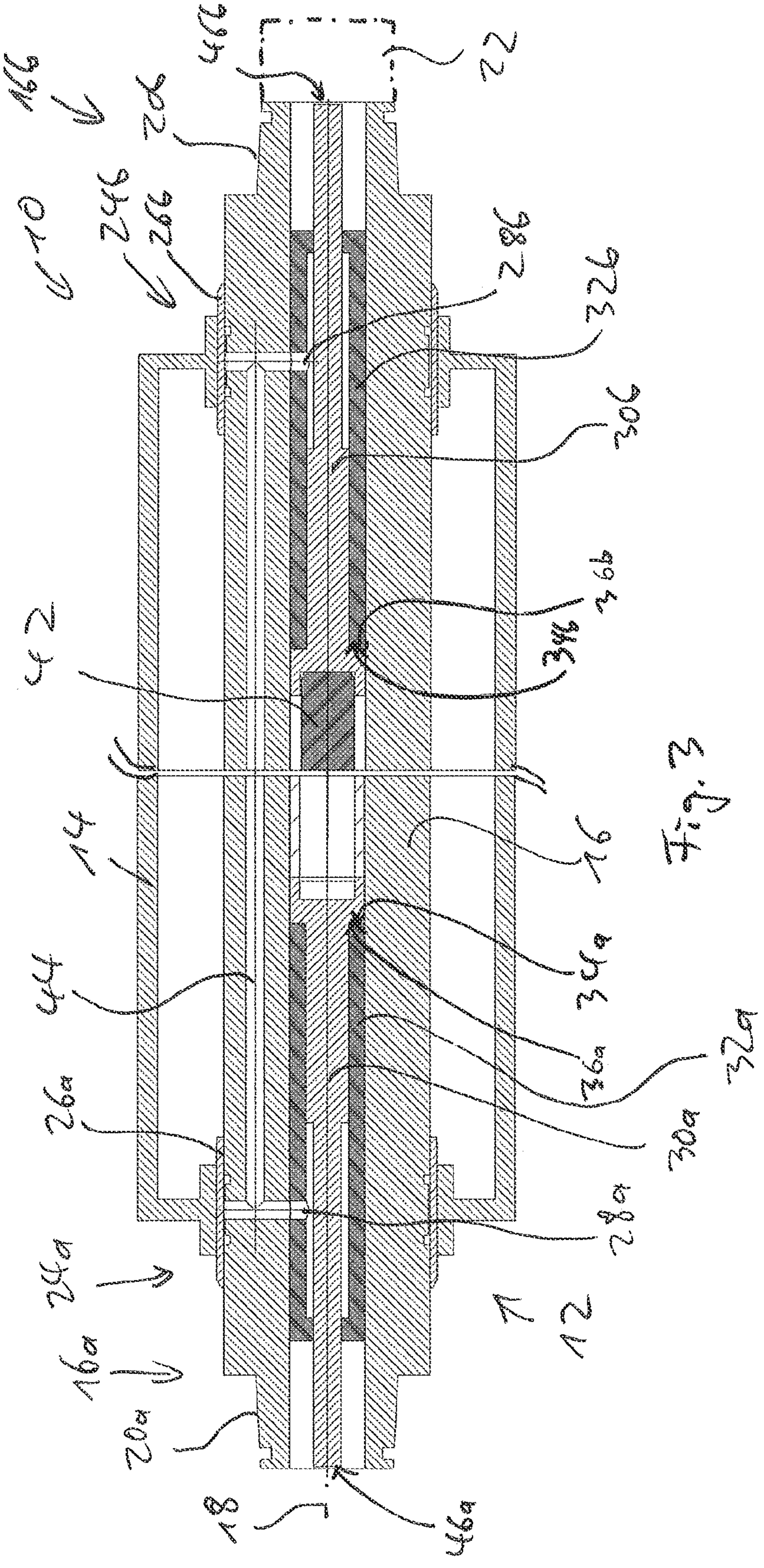

In the example shown in FIGS. 1 to 3, the preloading unit 38 is used for both pistons 30*a*, 30*b* and is located between them.

The preloading unit 38 comprises a spring assembly 40, which is an arrangement of disk springs in the example shown.

In order to be able to use the functioning principle of the clamping shaft 12 for different lengths of the clamping shaft 12, piston 30*b* is connected to the preloading unit via a bar 42. Consequently, the length of the clamping shaft 12 may be adapted by changing the length of the bar 42. The remaining parts of the clamping shaft 12, especially the pistons 30*a*, 30*b* and the fluid chambers 28*a*, 28*b* do not need to be altered.

Moreover, the fluid chambers 28*a*, 28*b* are fluidically connected via a fluid connection line 44.

In the example shown the fluid connection line 44 is an axial bore located inside the shaft body 16.

As will be explained in the following, the fluid connection line 44 makes is possible to put both combinations of a piston 30*a*, 30*b* and a cylinder part 32*a*, 32*b* in the first relative position by just actuating one of the pistons 30*a*, 30*b*. This means that the clamping shaft 12 can be put into the release state by just actuating one single pistons 30*a*, 30*b*.

To this end, both pistons 30*a*, 30*b* comprise an actuation interface 46*a*, 46*b*, which is a realized as an axial end face of the respective piston 30*a*, 30*b*. This end face is provided at an axial end of the shaft body 16 and thus is well accessible for actuation.

Thus, if one of the actuation interfaces 46*a*, 46*b* is pushed either manually or automatically, the pressure in both fluid chambers 28*a*, 28*b* is reduced.

Since the forces resulting from the pressure of the fluid are counterbalanced by the preload forces resulting from the preloading unit 38, both the piston 30*a*, 30*b* actually actuated and also the piston 30*a*, 30*b* not directly actuated move towards an axial middle of the clamping shaft 12, thereby attaining the first relative position.

In summary, the clamping shaft 12 is in a clamping state, if it is not actuated and it is in a release state if it is actuated by pushing against at least one of the actuation interfaces 46*a*, 46*b*. Of course, the release state can also be achieved by pushing on both actuation interfaces 46*a*, 46*b*.

Figure 4:
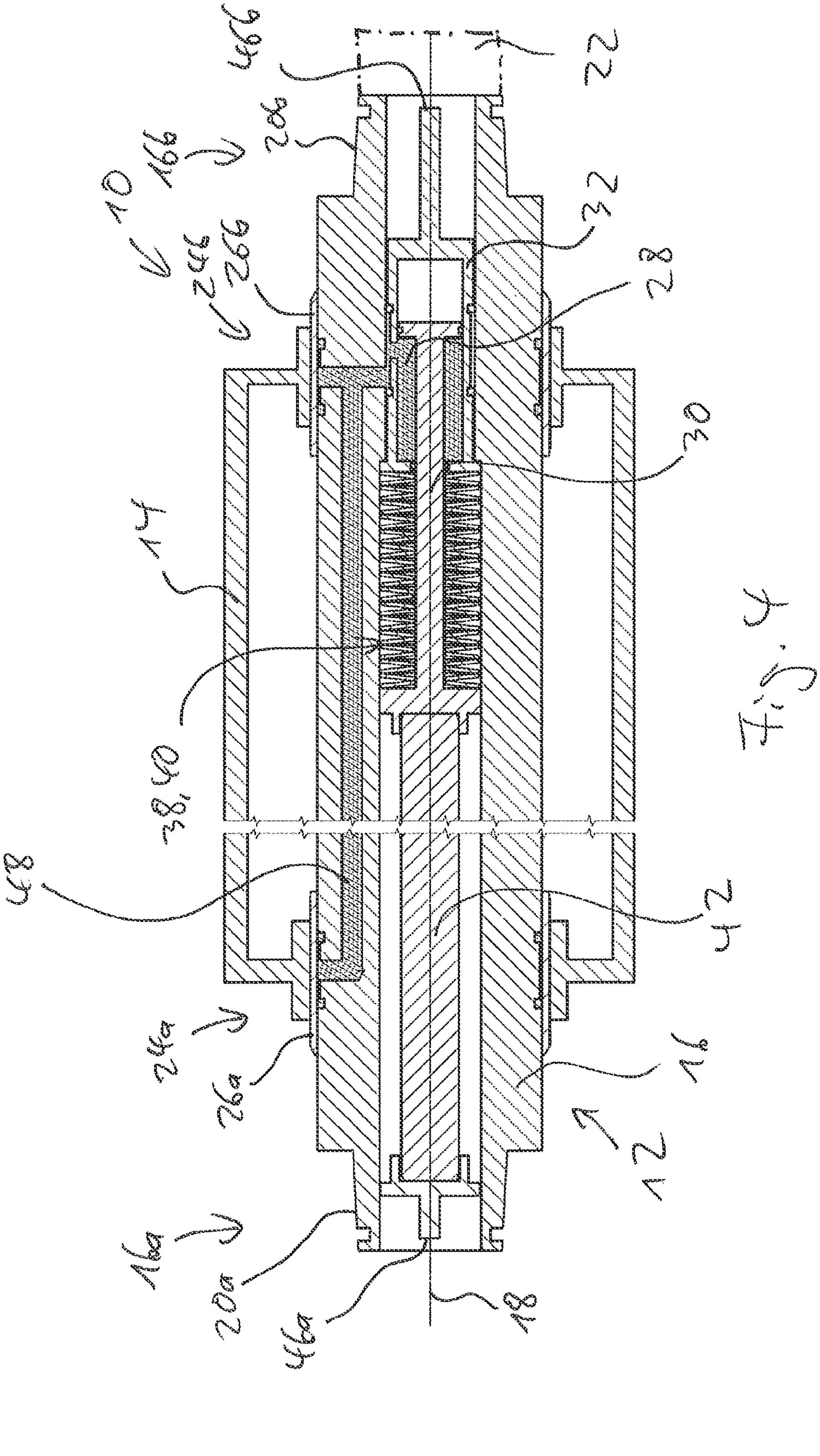

FIG. 4 shows a second embodiment of the printing cylinder unit 10, which differs from the embodiment of FIGS. 1 to 3 in that a different clamping shaft is used. In the following, only the differences with respect to this first embodiment will be explained. Corresponding parts will be designated with the same references signs that already have been used in FIGS. 1 to 3, where appropriate the suffixes are omitted in FIG. 4.

Essentially, the embodiment of FIG. 4 differs from the embodiment of FIGS. 1 to 3 in that there is only one single piston 30 and one single cylinder part 32 cooperating with the piston 30. Both delimit a single fluid chamber 28 and are movable inside the shaft body 16.

In contrast to the example of FIGS. 1 to 3, the single fluid chamber 28 is associated with two clamping regions 24*a*, 24*b*. More precisely, the single fluid chamber 28 is delimited by two elastically deformable sleeves 26*a*, 26*b*. To this end, the fluid chamber 28 comprises an axial bore 48 in the shaft body 16.

The preloading unit 38 biases the piston 30 against the cylinder part 32.

The clamping shaft 12 according to FIG. 4 may be operated as follows.

If the clamping shaft 12 is actuated by pushing on either actuation interface 46*a* of the piston 30 or actuation interface 46*b* of the cylinder part 32, the piston 30 and the cylinder part 32 will move relative to each other against the preloading force of the preloading unit 38.

In doing so, the fluid inside the fluid chamber 28 will be de-pressurized and the diameter of the sleeves 26*a*, 26*b* will be elastically decreased. Consequently, the clamping shaft 12 will attain a release state.

If none of the actuation interfaces 46*a*, 46*b* is pushed, the clamping shaft 12 is in its clamping state.

The invention claimed is:

1. A clamping shaft for a rotationally driven part, the clamping shaft comprising:

a shaft body being rotatable about a shaft axis; and at least one fluid chamber being located inside the shaft body and being filled with a predetermined amount of fluid, wherein the fluid chamber is delimited by a piston surface of a piston being located inside the shaft body and a cylinder part, being movable relative to each other such that a volume of the fluid chamber is adjustable by moving the piston relative to the cylinder part, wherein the shaft body comprises at least one elastic clamping region delimiting the fluid chamber, wherein the clamping region has a first diameter when the piston and the cylinder part are in a first relative position, and a second diameter when the piston and the cylinder part are in a second relative position, the second diameter being bigger than the first diameter, wherein the clamping shaft further comprises a spring assembly applying a preloading force on the piston and/or the cylinder part such that the piston and the cylinder part are biased towards the second relative position, wherein the preloading force on the piston and/or the cylinder part is selectively counteracted by an external force from an actuation interface of the piston.

2. The clamping shaft according to claim 1, further comprising:

two fluid chambers, each being located inside the shaft body and each being filled with a predetermined amount of fluid, wherein each of the two fluid chambers is delimited by a piston surface of a piston being located inside the shaft body and a cylinder part, being movable relative to each other such that a volume of the fluid chamber is adjustable by moving the piston relative to the cylinder part, wherein the shaft body comprises two elastic clamping regions each delimiting one of the fluid chambers, wherein the two elastic clamping regions have a first diameter when the corresponding piston and the corresponding cylinder part are in a first relative position, and a second diameter when the corresponding piston and the corresponding cylinder part are in a second relative position, the second diameter being bigger than the first diameter, and wherein the spring assembly is located between the pistons or between the cylinder parts and applies the preloading force on the pistons or the cylinder parts such that each of the pistons and the corresponding cylinder parts are biased towards the second relative position.

3. The clamping shaft according to claim 2, wherein the fluid chambers are fluidically connected via a fluid connection line located inside the shaft body.

4. The clamping shaft according to claim 2, wherein each of the two elastic clamping regions is formed integrally with the shaft body or wherein each clamping region is provided by an elastically deformable sleeve provided on the shaft body.

5. The clamping shaft according to claim 2, wherein at least one of the pistons and/or the cylinder part cooperating with the piston comprises the actuation interface by which the external force may be applied to the piston and/or the cylinder part counteracting the preloading force such that at least one of the pistons and the corresponding cylinder part are in the first relative position.

6. The clamping shaft according to claim 5, wherein the actuation interface is provided in proximity to an axial end of the shaft body.

7. The clamping shaft according to claim 1, wherein an abutment surface associated with each piston is provided in the shaft body, each piston abutting against the respective abutment surface when the piston and the cylinder part are in the second relative position.

8. The clamping shaft according to claim 1, wherein the spring assembly includes one or more of a disk spring assembly, a coil spring assembly, or a gas spring assembly.

9. The clamping shaft according to claim 1, wherein the shaft body comprises at least one bearing interface, by which the clamping shaft is rotatably supportable, the shaft body preferably comprising two bearing interfaces.

10. The clamping shaft according to claim 1, wherein the shaft body comprises at least one drive interface by which the clamping shaft is rotationally drivable.

11. A printing cylinder unit of a printing machine, the printing cylinder unit comprising:

the clamping shaft according to claim 1.

12. A method for operating the clamping shaft of claim 1, the method comprising:

providing the clamping shaft in a clamping state when the clamping shaft is not actuated; and providing the clamping shaft in a release state when the clamping shaft is actuated.

13. The method according to claim 12, wherein the clamping shaft is actuated by pulling the actuation interface along an axial direction of the clamping shaft, by pushing the actuation interface along an axial direction of the clamping shaft, or by turning the actuation interface around an axial direction of the clamping shaft.

14. A clamping shaft comprising:

a shaft body including a fluid chamber and a clamping region;

a piston to move in the shaft body to adjust a volume of the fluid chamber to change a diameter of the clamping region, wherein the clamping region has a first diameter when the piston is in a first relative position, and a second diameter, larger than the first diameter, when the piston is in a second relative position;

a spring assembly to bias the piston towards the second relative position; and an actuation interface to counteract the bias of the spring assembly to move the piston to the first relative position.

* * * * *